July 17, 1962  O. BERNHARDT  3,044,907
PIPE THREAD WIPING METHOD AND APPARATUS
Filed Nov. 24, 1958  6 Sheets-Sheet 1

OTTO BERNHARDT,
INVENTOR.

HERZIG & JESSUP,
ATTORNEYS.
BY

Albert M. Herzig

July 17, 1962  O. BERNHARDT  3,044,907
PIPE THREAD WIPING METHOD AND APPARATUS
Filed Nov. 24, 1958  6 Sheets-Sheet 2
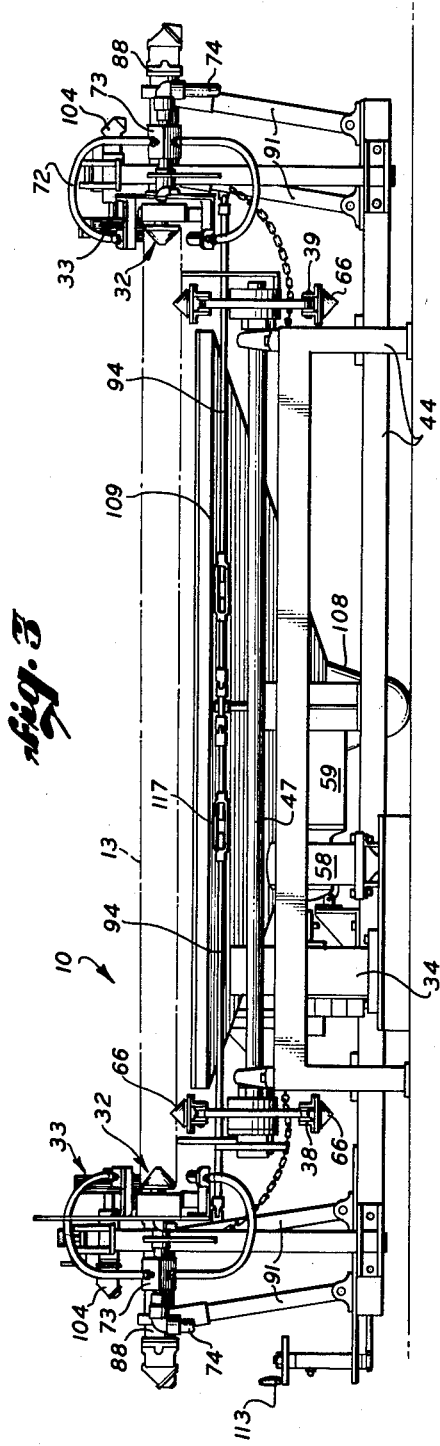
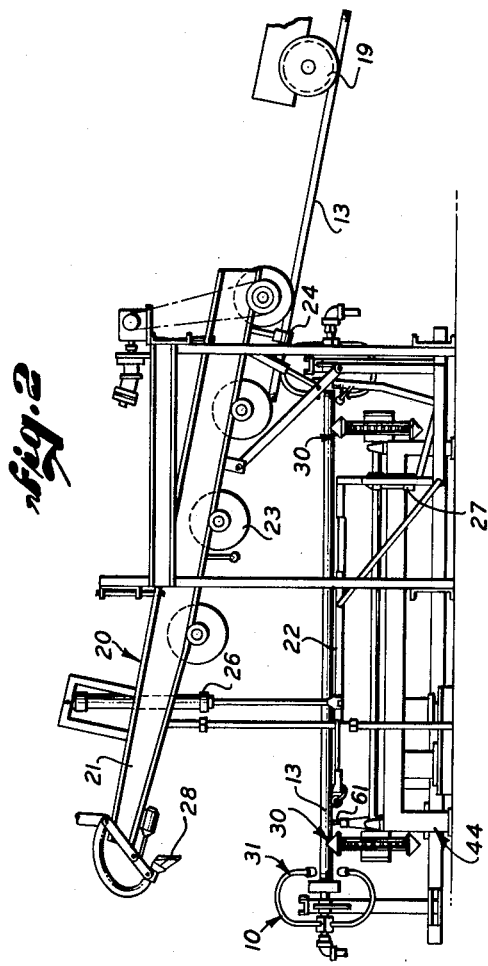
OTTO BERNHARDT,
INVENTOR.
HERZIG & JESSUP,
BY  ATTORNEYS.

July 17, 1962 O. BERNHARDT 3,044,907
PIPE THREAD WIPING METHOD AND APPARATUS
Filed Nov. 24, 1958 6 Sheets-Sheet 3
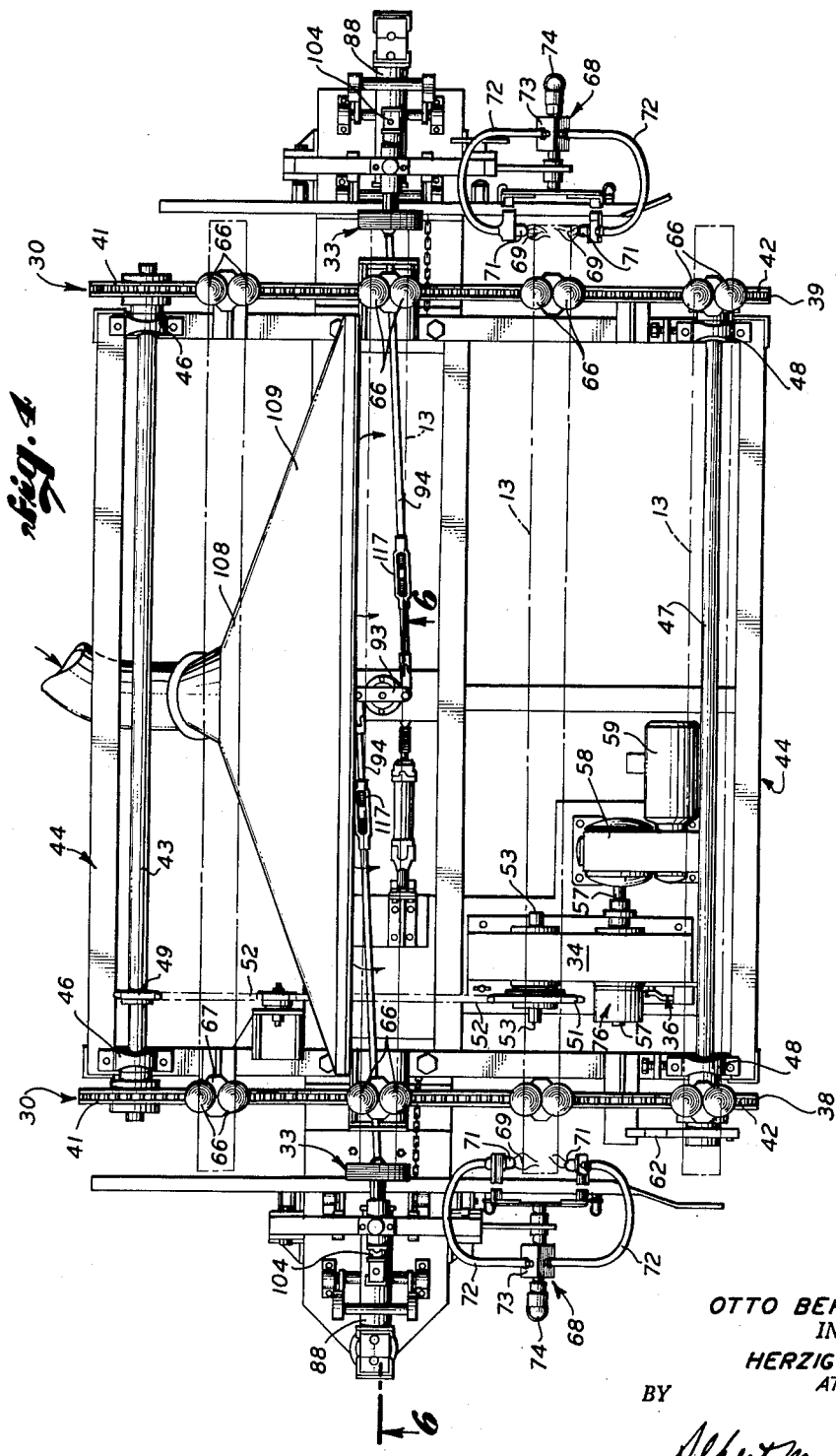
OTTO BERNHARDT,
INVENTOR.
HERZIG & JESSUP,
ATTORNEYS.
BY July 17, 1962  O. BERNHARDT  3,044,907
PIPE THREAD WIPING METHOD AND APPARATUS
Filed Nov. 24, 1958  6 Sheets-Sheet 4
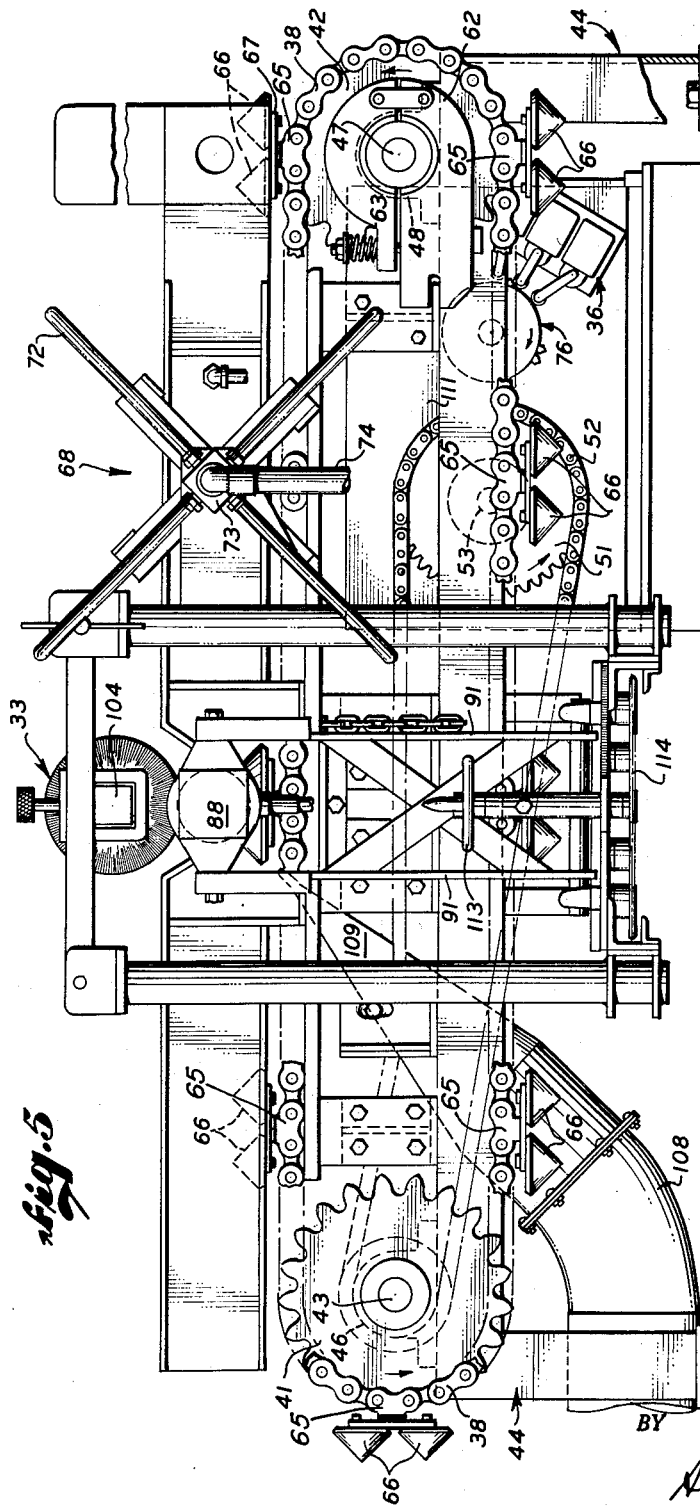
OTTO BERNHARDT,
INVENTOR.
HERZIG & JESSUP,
ATTORNEYS.

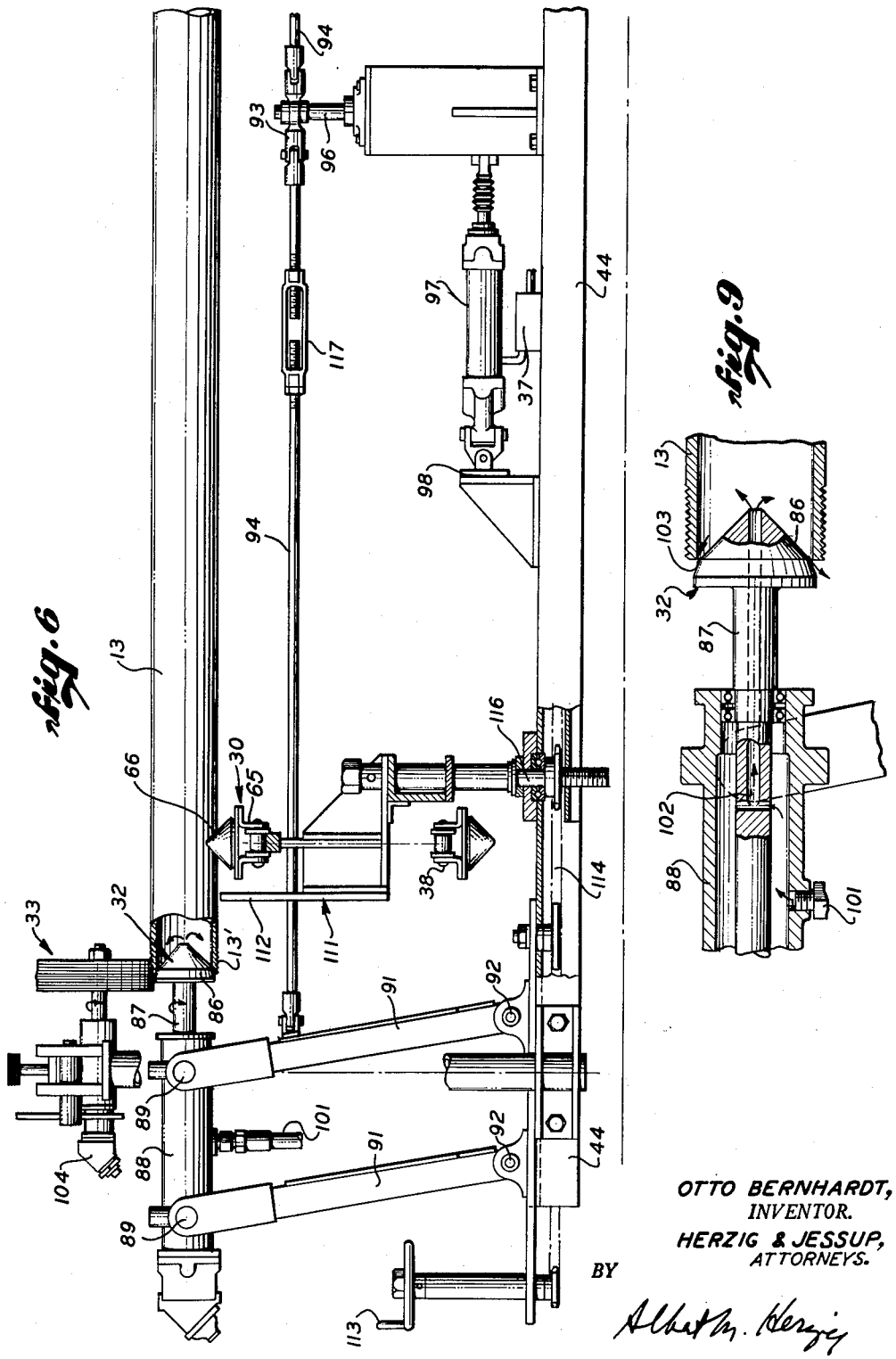

July 17, 1962 — O. BERNHARDT — 3,044,907
PIPE THREAD WIPING METHOD AND APPARATUS
Filed Nov. 24, 1958 — 6 Sheets-Sheet 6
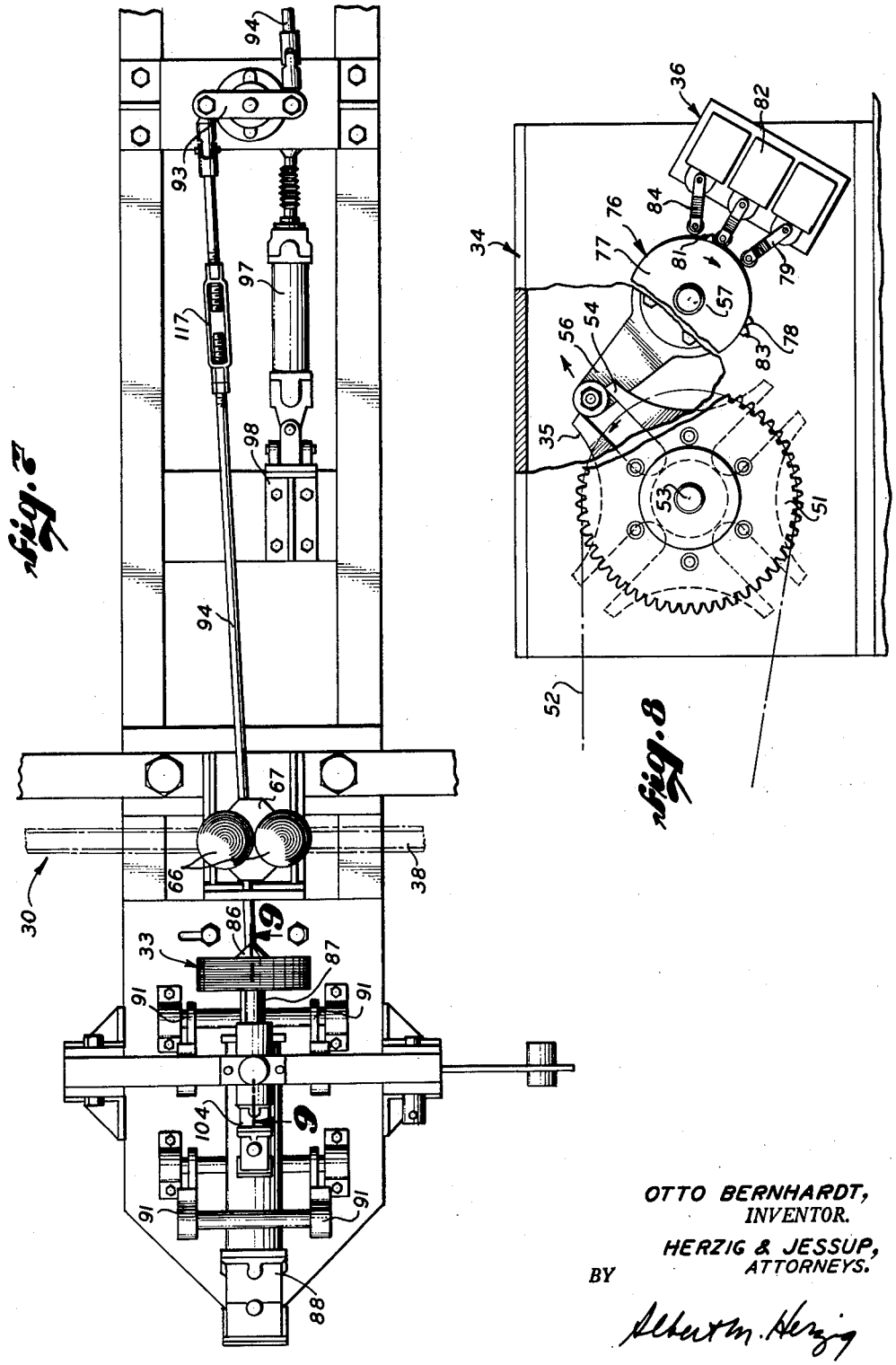
OTTO BERNHARDT,
INVENTOR.
HERZIG & JESSUP,
ATTORNEYS.
BY
Albert M. Herzig

# United States Patent Office 3,044,907
Patented July 17, 1962

3,044,907
PIPE THREAD WIPING METHOD AND APPARATUS
Otto Bernhardt, Gardena, Calif., assignor, by mesne assignments, to Rome Cable Corporation, Rome, N.Y., a corporation of Delaware
Filed Nov. 24, 1958, Ser. No. 775,930
15 Claims. (Cl. 134—5)

This invention relates to a thread wiping apparatus and more particularly to a means and method for removing excess coating material from conduits which have been provided with external threads at each end thereof prior to being subjected to a dip bath for coating both the interior and exterior thereof.

This invention involves improvements in methods and apparatus by means of which metal conduits, such as steel conduits, are internally and externally coated by a protective metallic material such as molten zinc, or the like. Heretofore it has been necessary to cut external threads on the ends of the conduit after the conduits have been dipped in the coating material because of the undesirable build-up of excess material on the threads when dipped, which is generally in excess and not uniform.

It has been found, however, that cutting a thread on a galvanized or otherwise coated pipe, after the coating has been applied thereon, is likewise undesirable, inasmuch as the coating at the ends upon which the threads are applied are completely void of coating material after the threading operation thereby exposing the ends to corrosion.

An additional disadvantage of dip coating is the tendency for an excess of coating material to gather on the inner diameter of the conduit adjacent the ends, thereby forming undesired restriction of flow through the ends and a build-up of coating material on the outer surface of the ends. Not only does an excess of material at the ends cause a restriction to flow through the conduits, but in addition such build-ups tend to flake off or crumble during use, thereby presenting the possibility of introducing a foreign matter, the flakes of coating, to the material being flowed through the pipe, such foreign particles being capable of being conveyed to machines or apparatus connected thereto whereby serious injury or undue wear thereto may be caused.

It is therefore an object of this invention to wipe the excess protective coating material from the ends of a conduit which has been internally and externally coated by a protective material.

It is another object of this invention to provide a means and method of wiping excess material from the ends of the conduit whereby threads may be cut on the external surface of the ends prior to the coating of the protective material and whereby such threads are more uniformly coated for protection against corrosion having removed therefrom any build up of excess material.

A further object of this invention is to provide a means and method of the character described, whereby excess coating material is removed from the outer surface and inner surface of the ends of the conduit to remove any build-up of coating material thereat and thereby provide a more uniform coating on these surfaces with no restrictions to flow of material through the conduit.

Yet another object of this invention is to provide a means and method for removing excess coating material from the ends of a coated conduit which is automatically and sequentially operated in timed cycles, whereby mass production of a high quality finished product is possible, saving considerable time and providing a more uniform coating on the ends.

A further object of this invention is to provide an apparatus for the above-described purpose which can be introduced into present day apparatuses for coating protective material on the conduits, being provided with a conveyor system whereby the conduit is conveyed from the coating apparatus to the various stations for removing excess material from the ends of the conduit.

A general object of this invention is to provide a means and method for wiping excess coating material from the ends of a conduit which overcomes disadvantages of prior means and methods heretofore intended to accomplish a generally similar purpose.

These and other object will be more apparent from the following drawings, detailed description and appended claims.

In the drawings:

FIG. 2 is an enlarged vertical cross-sectional view as taken on a line 2—2 of FIG. 1 illustrating the apparatus of the present invention relative to a conduit wiping apparatus of the coating system illustrated in FIG. 1;

FIG. 3 is an enlarged view of a thread-wiping apparatus in accordance with this invention;

FIG. 4 is a plan view thereof;

FIG. 5 is an enlarged side view thereof, with parts broken away for greater clarity;

FIG. 6 is an enlarged vertical cross-sectional view as taken substantially along a line 6—6 of FIG. 4;

FIG. 7 is a plan view of a portion of the apparatus illustrated in FIG. 6;

FIG. 8 is an enlarged side view of a portion of the drive means incorporated herein; and FIG. 9 is an enlarged fragmentary vertical cross-sectional view as taken substantially along a line 9—9 of FIG. 7, illustrating means for introducing a blast of air into a conduit in accordance with this invention.

Figure 1:
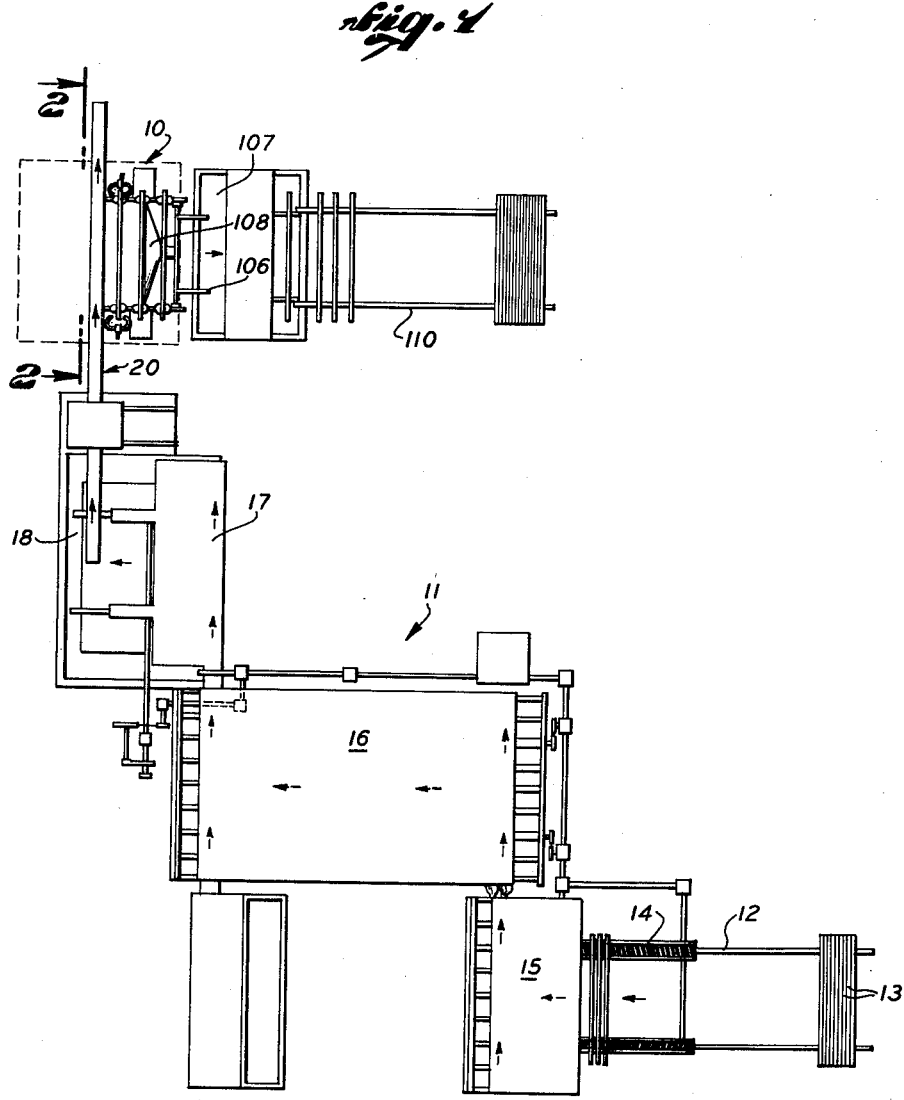
FIG. 1 is a diagrammatic plan view illustrating the apparatus, designed and constructed in accordance with this invention, as introduced into a continually operated protective coating system.

Referring more particularly to the drawings, there is shown, by way of illustration but not of limitation, a thread-wiping apparatus generally designated by the numeral 10 designed and constructed in accordance with this invention. In FIG. 1, the thread-wiping apparatus 10 is illustrated as being correlated to a conduit-coating apparatus generally designated by the numeral 11. The apparatus 11 does not form a part of this invention, per se, but is diagrammatically illustrated and briefly described herein for the purpose of illustrating the adaptability of the thread-wiping apparatus of this invention in conjunction therewith.

Referring to FIG. 1, the apparatus 11 comprises a loading rack 12 on which a plurality of conduits 13 are placed for engagement with a conveyor 14 which conveys the conduit 13 into an oxidizing furnace 15. The conduits are continually fed into the furnace and then into a reducing furnace 16 from which they are conveyed to a coating apparatus 17 having a zinc pot 18 in which the conduits are dipped. After being coated in the zinc pot 18, the conduit is raised outwardly therefrom and conveyed by electromagnetic roller means 19 to a wiping apparatus generally designated by the numeral 20.

The wiping apparatus 20 includes a stationary frame 21 and a movable carriage 22, a conduit 13 being conveyed by the electromagnetic rollers 19 and similar rollers 23 of the frame 21, through a wiping ring 24 which is adapted to blow off excess coating material from the exterior of the tube, whereupon the conduit is dropped or placed on the carriage 22, which by means of hydraulic cylinders 26 and 27 positions the conduit against a nozzle 28 for blowing out excess material from the interior of the tube. Subsequently, the frame 22 is automatically lowered, the lowermost position being illustrated in FIG. 2, whereby the conduit 13 is deposited on a conveyor means 30 of the thread-wiping apparatus 10. The purpose of the thread-wiping apparatus, previously mentioned, is to wipe excess material which may remain on the external threads 13' which have been cut at each end of the conduit 13 prior to the loading of the conduits on the loading rack 12.

Although the conduit has been previously passed through external and internal wiping means, to remove excess molten material from the exterior and interior of a conduit 13, it has been found that the sharp-edged surface of the ends and the threads 13' tend to retain an excessive amount of coating material. Such excess material on the threads is undesirable, inasmuch as it makes installation of fittings to the ends difficult and sometimes impossible, and frequently results in flaking off of large areas of the coating when an attempt is made to force a fitting thereon. Also an excess of material adjacent the edge or on the edge of the ends of the conduit forms bumps and protusions and a rough external surface. It is for the purpose of eliminating or removing such objectionable excess of material that the thread-wiping apparatus 10 is provided.

The thread-wiping apparatus 10, in general, comprises the previously-mentioned conveyor means 30 upon which the conduits 13 are periodically deposited, the conveyor being adapted to carry the conduits in a linear direction, transversely to the axis of the conduit, to a heating station. At the heating station, the ends 13' of the conduits are heated by a heating means 31 whereby the coating thereon is reduced to a molten state, after which the conduit 13 is conveyed to a wiping station wherein a holding means 32 is actuated to engage the conduit 13 at each end thereof and lift the conduit into engagement with a rotating brush means 33 which brushes off excess material from the threads 13' of the conduits 13 leaving a relatively thin coating thereon for protection against corrosion. The holding means 32 includes means for introducing a blast of gaseous material, simultaneously through each end thereof, into the interior of the conduit while providing an infinitely decreasing annular space adjacent the peripheral edge of the ends of the conduit. The gaseous material being blasted escapes from the conduits 13 through the annular spaces and because the area of the annular space is smaller than the area of the incoming blast of gaseous matter, an increase of velocity of the gas at the annular space is effected whereby any excess material thereon is blown away, leaving a uniform relatively thin coating on the conduit end. The conveyor means 30 and holding means 32 are cyclically intermittently operated, there being a timing means 34, in the form of a Geneva drive 35, cam-operated switch means 36 and a timer 37 for controlling the holding means 32.

The conveyor means 30 comprises a pair of spaced, endless chains 38 and 39, each chain 38, 39 being in engagement with a rearward drive sprocket 41 and a forward idler sprocket gear 42. The sprocket gears 41 are fixed to a common shaft 43 extending transversely of a frame 44 of the apparatus 10 and supported thereon by a pair of bearing members 46. The forward sprocket gears 42 are fixed to a common shaft 47 rotatably mounted on the frame 44 as in bearings 48.

A sprocket gear 49 is secured to the shaft 43 and is driven by a sprocket gear 51 of the timing means 34 by means of a sprocket chain connection 52 shown in broken lines in FIGS. 4, 5, and 8. The sprocket gear 51 is secured to a shaft 53; the shaft 53 being common with the gear 51 and the Geneva star 54 of the Geneva drive means 35. The star 54 is intermittently rotated by means of an actuator 56 which is secured to a drive shaft 57 extending outwardly from a gear reduction box 58 of a drive motor 59.

The conveyor means 30 is actuated by the placing or depositing of a conduit 13 thereon. For this purpose, a switch 61, conveniently mounted on the frame 44, is depressed by the weight of the conduit 13 when placed on the conveyor 30 to close an electrical conduit to start the motor 59, which, through the reduction gear 58, drives the shaft 57 to rotate the actuator 56. The actuator 56, as well known in Geneva drives, rotates the Geneva star wheel 54 one-quarter turn for every complete turn of the actuator 56. As the Geneva star 54 rotates a quarter turn, the sprocket gear 51 rotates the sprocket gear 49 through the sprocket chain 52 to rotate the shaft 43. The shaft 43, being secured to the sprockets 41, rotates the sprockets, which translate the rotary motion into a linear movement of the conveyors 38 and 39 a predetermined distance corresponding to the quarter turn of the star wheel 54.

As best seen in FIG. 5, the transverse shaft 47, supporting the forward sprocket gears 42, extends outwardly of the frame 44 and has one end thereof engaging a brake member 62 which is spring biased as by a coil spring 63 to provide a constant braking action to the shaft 47 to prevent overriding of the conveyors 38 and 39 when the Geneva star 54 is disengaged by the actuator 56, giving a positive stopping action at predetermined points.

In order to minimize friction between the conveyors 38 and 39 and a conduit 13 conveyed thereon, each conveyor is provided with spaced frictionless supports for the conduits 13 in the form of pairs of conical members 66 rotatably supported on brackets 67 secured to spaced links 65 of the endless chains 38 and 39. In this manner various sizes of conduits may be handled by the conveyors without requiring adjustment of the support members and the support members 66, being rotatable, offer a minimum of resistance or friction to a conduit 13 supported thereon thereby avoiding removal, scratching or marring of the coating on the conduit. The support members 66 of one endless chain are aligned with the support members 66 of the other spaced parallel sprocket chain, and the chains 38, 39, being driven by a common shaft 43, move together at a uniform rate thereby delivering the ends 13' of each of the conduits simultaneously and in correct alignment with the subsequent operating stations, i.e., heating station and thread-wiping station.

As will now be clearly understood from the previous description, as a conduit 13 is a removed from a dip bath 18 in which a molten metal, such as zinc or the like, is coated on the exterior and interior of the conduit, the conduit is conveyed as by magnetic roller means to a wiping apparatus 20 in which the coated pipe is treated as by blasts of air internally and externally to remove excess molten material from the interior and exterior of the conduit. At the end of this operation, a conduit 13 is dropped or placed upon the conveyors 38 and 39 of the thread-wiping apparatus 10, causing a switch 61 to close an electric circuit to start a drive motor 59 mounted on the frame 44 of the apparatus 10. The drive motor causes a Geneva drive to rotate the conveyors 38 and 39 a predetermined distance after which the conduit is in alignment with a heating station generally designated by the numeral 68.

The heating means 68 comprises an inwardly radially directed flame 69 arranged circumjacent each end of the conduit 13 stationed thereat. The flame 69 is preferably of a high temperature, the fuel for which may be of any suitable gaseous material supplied to nozzles 71 adjacent the conduit end 13′ by a plurality of conduits 72 extending outwardly from a manifold 73 of a supply line 74. The heating means heats the ends 13′ of the conduit 13 until the coating material thereon, which has solidified, is reduced to a molten state to facilitate removal of excess coating material. The intensity of heat is preferably so provided that the coating on the end of the conduit is reduced to a molten state at the end of the period of time which it takes for the subsequent conduit from the wiping means 20 to be deposited at the front end of the conveyors 38 and 39 to depress the switch 61 to restart the motor 59 to advance the conduit 21 which has been heated to the next station which is the thread-wiping station and convey the last dropped conduit 13 to the station of the heating means. The intermittent actuation of the conveyor means, as affected by the star wheel 54, and subsequent operations of the apparatus 10 are controlled by a cam means 76 operatively associated with the drive motor and the switch means 36.

The cam means 76 includes a cam 77 having a plurality of peripherally and longitudinally spaced projections for actuation of the switch means 36 in the following manner: after the conduit 13 has been placed on the conveyor means 30 and actuates the switch 61 to start the motor 59, the shaft 57 is rotated until a projection 78 of the cam means 76 actuates a switch 79 of the switch means 36 to cause the carrier 22 of the wiping apparatus 20 to return a load position to receive a newly dipped and coated conduit. The Geneva star wheel 54 drives the conveyors 38 and 39 to position the last delivered conduit in its first position, the heating means station, at which time the actuator 56 is disengaged therefrom and the brake means 62 causes the conveyor to stop, aligning the conduit 13 accurately with the heating means 68. The cam means 76 continues to rotate, causing a projection 81 thereof to engage a switch 82 thereby actuating the continually rotating holding means 32 to engage a previously-deposited conduit and lift said conduit into contact with the wire brush means 33, in a manner to be hereinafter described. The cam means 76 continues to rotate until a third projection 83 engages a switch 84 of the switch means 36 to turn off the motor 59 thereby arresting movement of the conveyors until a third conduit is placed on the conveyors to trip the switch 61.

The holding means 32 comprises a conical member 86 secured to a drive shaft 87 of a hydraulic motor 88, there being a holding means 32, having an opposite extending hydraulic motor 88 on each side of the frame 44 and spaced rearwardly from the heating station a distance equal to the distance of travel of the conveyor means at each movement of the Geneva star 54. Each hydraulic motor 88 is pivotally supported as by pins 89 for vertical and horizontal movement on support arms 91 pivotally secured to the frame 44 as at 92 for arcuate movement relative to the frame in a vertical plane. The inner arms 91 of each motor 88 are linked to an actuator member 93 as by tie rods 94, the actuator member being in the form of a bell crank secured to a vertical shaft 96 which is rotated by a hydraulic cylinder 97 secured at one end as at 98 to the frame 44.

After the conduit is positioned in alignment with the holding means 32, cam means 76, as previously mentioned, continues to rotate to actuate the switch 82 of the switch means 36 whereby the hydraulic cylinder 97 is extended to rotate the shaft 96, rotating the bell crank 93 into a position illustrated in FIG. 4, whereby the tie rods 94 pull the arms 91 inwardly to engage the holding means within the conduit 13, and, at its final inward stroke, raise the holding means into contact with the wire brush means 36 located directly thereabove.

At this time (when the conical members are entering the conduit), a blast of air is introduced into a conduit 101 communicating with the interior of the cylinder 88. The gaseous material under pressure enters a passage 102 extending through the shaft 87 and conical member 86 and into the interior of the conduit 13. A blast of air is simultaneously introduced, in this manner, into each end of the conduit, and as the conical members 86 of the holding means 32 approach each other, an annular passage 103 is formed at the end of the open ends of the conduit 13 through which the gaseous material escapes. As the conical members 86 infinitely decrease the annular opening 103, to come into ultimate contact with the conduit 13, the velocity of the escaping gaseous material increased, thereby carrying in its stream any particles of excess molten material at the outer ends of the conduit.

The hydraulic motors 88 are vertically and horizontally movable towards and away from each other in such manner that the axis of each motor is elevated when the motors are biased towards each other, by virtue of the fact that the arms 91 are inclined away from the top dead center. As the motors approach each other, the arms approach top dead center to elevate the motors and their respective conical members 86. The conveyors 38 and 39 are adjusted, by means to be hereinafter described, so that the axis of a conduit is spaced downwardly and vertically a predetermined distance from the axes of the conical members 86 at the position of contact of the members 86 therewith, so, that, when the members 86 approach and initially engage the conduit 13, the apices of the members 86 are above the center of the conduit, whereby, as the conical members 86 engage the conduit, the conduit is automatically centered relative to the axes of the members 86, thereby lifting the conduit from the conveyors a distance sufficient to bring the exterior surface of the threaded ends of the conduit into contact with the wire brush means 33.

As the holding means 32 positively engages the conduit 13, the conduit is coaxially positioned on the members 86 and thereby elevated into contact with the wire brush means 33 which is being constantly rotated by motor 104. The timer 37 is operatively associated with the cylinder 97 to hold conduit 13 in its elevated position for a predetermined length of time to permit the wire brush means to remove any excess molten material off the thread portion of the conduit 13.

During the next cycle of operation of the Geneva movement 35, a conduit 13 is progressively conveyed until it is ultimately delivered to a chute 106 on which it slides into a chromate bath 107 in which the conduit is quenched.

In order to control the degree of cooling of the galvanized conduit sections to permit spangles of zinc to form in the coating, rather than a coarse crystalline zinc structure, a blower 108 is provided on the frame 44 and has a fan shaped nozzle 109 adjacent the thread-wiping means to pre-cool the conduit before it is quenched in the chromate bath. The nozzle 109 preferably extends transversely on the frame 44 and is arranged to direct cooling air directly at the portion of the conduit between the threaded ends.

The conduits 13 are progressively lifted out of the chromate bath 107 and deposited on an unloading rack 110 in a completed state having a coating on the interior and exterior of the conduit and its pre-threaded ends being wiped to form a very uniform and thin coating of protective material.

As previously mentioned, various diameters of conduits 13 may be supported by the conical support members 66 of the support means or conveyor means 30. In order to compensate for the size of the conduits 13 and thereby provide a more accurate alignment with the holding means 32 at the thread-wiping station, an auxiliary support means 111 is preferably provided and adjustably mounted to the frame 44, to raise or lower the upper portion of the chains 38, 39. The lift means, includes an upwardly extending member 112, and may be elevated or lowered in accordance with the size of the conduit and to vertically offset the axis of the conduit 13 relative to the members 86 by a manually operated handle 113. Rotation of the handle 113 causes a sprocket chain drive 114 to extend or withdraw a threaded shaft 116 to which the lift means 111 is secured, thereby elevating or lowering the lift means 111.

Further adjustment is accomplished to more accurately position the holding means 32 relative to the conduits 13 by providing turn buckles 117 on the tie rods 94 to insure simultaneous engagement of the holding means 32 at each end of the conduit 13.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and methods.

What I claim is new and desire to secure by Letters Patent is:

1. Apparatus for wiping excess coating material from the ends of a conduit section comprising: a frame; heat means on said frame for simultaneously subjecting each of said ends of the conduit section to heat so that the coating thereon is reduced to a molten state; rotatable holding means on said frame and adjacent said heat means for internally supporting opposite ends of the conduit section and for rotating said conduit section; and rotatable brush means adjacent said holding means and externally engageable with said ends for wiping excess coating from the exterior of said ends of said conduit section.

2. An apparatus in accordance with claim 1 including conveyor means on said frame for intermittently conveying said conduit sections from said heat means to said holding means; and means for continually timing cyclic operation of said conveyor means and said holding means so as to time the heating of said end to melt the coating whereby the coating is in a molten state when conveyed to said holding means.

3. Apparatus for wiping excess coating material from the ends of a conduit section comprising in combination: a frame; heat means operatively associated with said frame for subjecting said ends to heat so that the coating is reduced to a molten state; nozzle means operatively associated with said frame for simultaneously directing a blast of gas into each end of said conduit means; and means for simultaneously forming an infinitely decreasing annular space between the internal surface of said conduit section and each said nozzle means so as to blow excess molten coating outwardly of said conduit section through said annular spaces.

4. An apparatus for wiping excess coating material from the ends of a conduit section comprising: a frame; means on said frame for subjecting each of said ends of said conduit section to heat, so that the coating thereon is reduced to a molten state; support means pivotally mounted on said frame to selectively internally support said ends of said conduit section; means for rotating said support means in one direction; brush means mounted on said frame adjacent said support means; means for rotating said brush means in an opposite direction; means for elevating said conduit section into contact with said brush means; and conveyor means for delivering said conduit section successively to said heat means, said support means and subsequently outwardly of said apparatus.

5. An apparatus in accordance with claim 4, including means for continuously timing cyclic operation of said conveyor means and said holding means.

6. An apparatus in accordance with claim 5, said support means including means for forming an infinitely decreasing annular space between the said last means and the interior of said conduit section; and means for directing a blast of gas into said conduit section for removing molten excess material from the interior of said conduit section.

7. An apparatus for wiping excess coating material from the ends of a conduit section comprising: a frame; conveyor means on said frame adapted for linear movement in a longitudinal direction relative to said frame; a plurality of conical members rotatably fixed on said conveyor means and spaced thereon for supporting said conduit section adjacent said ends thereof; guide means adjustably fixed on said frame for supporting an upper portion of said conveyor means; means for subjecting said ends of said conduit sections to heat for rendering said coating thereon plastic; rotatable support means on said frame for engaging the internal surface of said ends; wiping means on said frame and adjacent said support means for wiping excess material from the exterior of said ends; and means for continuously timing cyclic intermittent operation of said conveyor means and said support means.

8. An apparatus in accordance with claim 7 wherein said support means includes lifting means for elevating said conduit section into contact with said brush means.

9. An apparatus in accordance with claim 8 including: timing means for holding said ends in contact with said brush means.

10. An apparatus in accordance with claim 9, said support means including means for forming an infinitely decreasing annular space between said last means and the interior of said conduit section; and means for directing a blast of gas into said conduit means for removing molten excess material from the interior of said conduit means through said annular space.

11. A method of wiping excess coating material from the exterior of the threaded ends of a conduit section comprising the steps of: heating said ends so as to reduce the coating thereon to a molten state; rotating said conduit section; and holding a brush against each of said ends while said conduit is rotating so as to remove a quantity of molten coating therefrom.

12. A method for wiping excess coating material from the exterior of the threaded ends of a conduit section comprising the steps of: heating said ends so as to reduce the coating thereon to a molten state; rotating said conduit section in one direction; rotating a wire brush in a direction opposite to the rotation of said conduit; and holding said ends against said brush while said conduit and said brush are rotating so as to remove a quantity of said molten coating therefrom.

13. A method for removing excess coating material from the interior and exterior of the ends of a conduit section comprising the steps of: heating said ends until the coating thereon is molten; simultaneously and progressively inserting a hollow cone into each end of said conduit section so as to form an infinitely decreasing annular space adjacent to each end thereof; directing a blast of gas through said hollow cones into said conduit section while decreasing each said annular space, thereby removing excess coating material from the interior of said conduit section outwardly of said conduit section through said annular space; rotating said conduit section in one direction; elevating said conduit section ends into external engagement with brush means; and rotating said brush means in an opposite direction to remove excess coating material from the exterior of said ends of said conduit section.

14. A method for removing excess coating material from the open ends of a conduit section comprising the steps of; heating said ends; forming a progressively decreasing annular space adjacent to the internal surface of the ends of the conduit section; directing a blast of gas into said conduit means while decreasing the annular space; and exhausting said gas through said annular space to remove excess molten coating material from said internal surface.

15. A method for removing excess coating material from the ends of a conduit section comprising the steps of: heating said ends; forming an annular space adjacent to said ends and to the internal surface of said conduit section; directing a blast of gas into said conduit means; exhausting said gas through said annular space while directing said blast of gas to remove excess molten coating material therefrom; lifting said conduit section into engagement with brush means; rotating said conduit means in one direction; and rotating said brush means in an opposite direction to remove molten excess material from the exterior of said ends.

References Cited in the file of this patent

UNITED STATES PATENTS

| | | |
|---|---|---|
| 969,179 | Murphy | Sept. 6, 1910 |
| 1,912,361 | Camerota | June 6, 1933 |
| 1,982,590 | Church et al. | Nov. 27, 1934 |
| 2,011,659 | Soyland | Aug. 20, 1935 |
| 2,658,466 | Hall | Nov. 10, 1953 |
| 2,683,436 | Marantz | July 13, 1954 |
| 2,692,458 | Laurence | Oct. 26, 1954 |
| 2,789,927 | Olson | Apr. 23, 1957 |
| 2,795,002 | Davies | June 11, 1957 |

FOREIGN PATENTS

| | | |
|---|---|---|
| 477,804 | Canada | Oct. 16, 1951 |